(12) United States Patent
Robert

(10) Patent No.: US 6,379,274 B1
(45) Date of Patent: Apr. 30, 2002

(54) DRIVEN PULLEY

(75) Inventor: Jean Robert, Drummondville (CA)

(73) Assignee: Cvtech R & D Inc. (CA)

( * ) Notice: Subject to any disclaimer, the term of this patent is extended or adjusted under 35 U.S.C. 154(b) by 0 days.

(21) Appl. No.: 09/450,407

(22) Filed: Nov. 29, 1999

(51) Int. Cl.[7] .......................... F16H 55/56; F16H 61/00; F16H 63/00

(52) U.S. Cl. .............. 474/19; 674/12; 674/8; 674/21

(58) Field of Search ................. 474/8, 13, 14, 474/25, 18, 19, 17, 10, 21, 11; 192/54.52, 93 A, 55.51

(56) References Cited

U.S. PATENT DOCUMENTS

| | | | | |
|---|---|---|---|---|
| 4,378,221 A | * | 3/1983 | Huff et al. ..................... | 474/19 |
| 4,523,917 A | * | 6/1985 | Schildt ........................ | 474/19 |
| 4,571,216 A | | 2/1986 | Stieg et al. ..................... | 474/8 |
| 4,585,429 A | * | 4/1986 | Marier ...................... | 474/19 X |
| 4,592,737 A | | 6/1986 | Dhont ......................... | 474/19 |
| 5,403,240 A | * | 4/1995 | Smith et al. .................... | 474/8 |
| 5,516,333 A | | 5/1996 | Benson ........................ | 474/19 |
| 5,538,120 A | * | 7/1996 | Berardicurti ............. | 192/54.52 |
| 5,720,681 A | * | 2/1998 | Benson ................ | 192/54.52 X |
| 5,967,286 A | | 10/1999 | Hokanson et al. .......... | 192/110 |

FOREIGN PATENT DOCUMENTS

| | | |
|---|---|---|
| EP | 0383282 | 8/1990 |
| WO | 9954647 | 10/1999 |

* cited by examiner

*Primary Examiner*—David A. Bucci
*Assistant Examiner*—Marcus Charles
(74) *Attorney, Agent, or Firm*—Bourque & Associates, P.A.

(57) ABSTRACT

The driven pulley (10) is used in a continuously variable transmission (CVT). It is coaxially mountable around a main shaft (12) and comprises two opposite conical flanges, namely a first flange (14) and a second flange (18), which face each other. An annular cam plate (40) is coaxially connected to the side of the second flange (18) that is opposite the first flange (14). The cam plate (40) comprises at least two inclined first cam surfaces (42) and at least two inclined second cam surfaces (44) having an inverted inclination with reference to the first cam surfaces (42). A first radially-extending support (50) bears a set of first cam followers (54). The first support (50) is at a fixed axial distance from the first flange (14) and each first cam follower (54) is engaged with a respective one of the first cam surfaces (42). Similarly, a second radially-extending support (60) bear a set of second cam followers (64). The second support (60) is also at a fixed axial distance from the first flange (14) and each second cam follower (64) is engaged with a respective one of the second cam surfaces (44). Spiral springs (70) are mounted between the first support (50) and the second support (60). This driven pulley (10) allows a control of the return force of the springs (70, 70') and maintains a good gripping force on the drivebelt (24) even when subjected to a reverse torque.

14 Claims, 11 Drawing Sheets

MINIMUM RATIO

MINIMUM RATIO

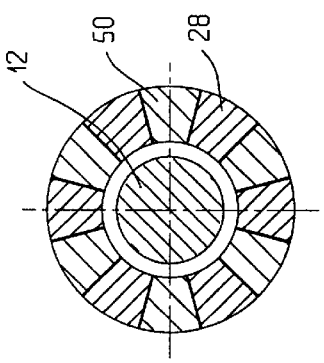
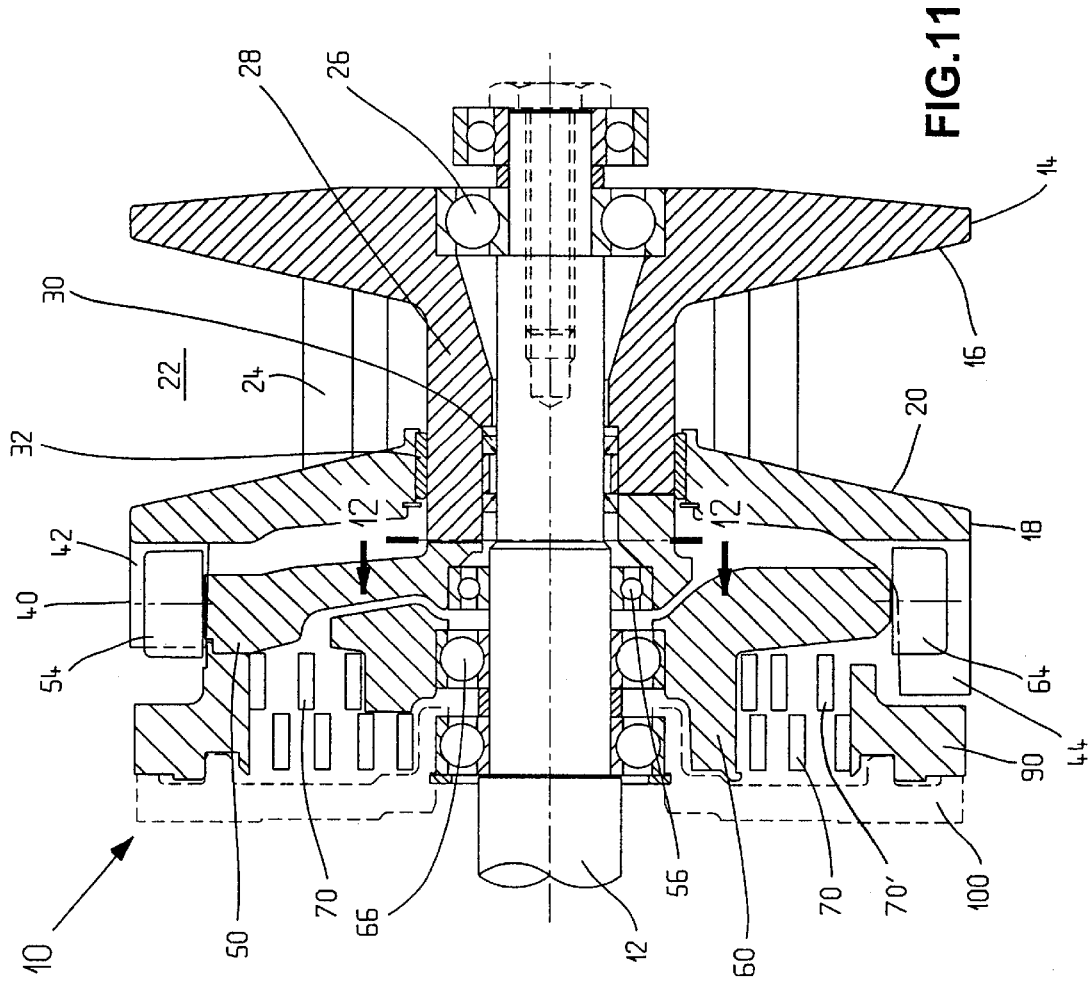

DRIVEN PULLEY

BACKGROUND

Continuously variable transmissions (CVT) are commonly used on a wide range of vehicles, such as small cars or trucks, snowmobiles, golf carts and scooters. They comprise a driving pulley connected to a motor, a driven pulley connected to wheels or a track, and a trapezoidal drivebelt transmitting torque between the driving pulley and the driven pulley. A CVT automatically changes the ratio as required by load and speed conditions, providing an increased torque under high loads at low speeds and yet controlling the rotation speed of the motor as the vehicle accelerates. A CVT may be used with all kinds of motors, such as internal combustion engines or electric motors.

The sides of the drivebelt are, on each pulley, gripped between two opposite flanges that are coaxially mounted around a main shaft. In each pulley of a conventional CVT, one flange, called "first flange", is rigidly connected to one end of the shaft. The other flange, called "second flange", is free to move with reference to the first flange. At the lowest rotation speed, the winding diameter of the driving pulley is minimal and the winding diameter of the driven pulley is maximum. This is referred to as the minimum ratio since there is the minimum number of rotations or fraction of rotation of the driven pulley for each full rotation of the driving pulley.

When the rotation speed of the driving pulley increases, its second flange moves closer to the first flange thereof under the effect of a centrifugal mechanism. This forces the drivebelt to wind on a larger diameter on the driving pulley and, consequently, on a smaller diameter on the driven pulley. The drivebelt then exerts a radial force on the flanges of the driven pulley in addition to the tangential driving force by which the torque is transmitted. This radial force urges the second flange of the driven pulley away from the first flange thereof. It is counterbalanced in part by a return force generated by a spring inside the driven pulley. It is also counterbalanced by a force generated by the axial reaction of the torque applied by the drivebelt on the driven pulley. This is caused by a cam system that tends to move the second flange towards the first flange as the torque increases. The cam system comprises a cam plate having a plurality of symmetrically-disposed and inclined cam surfaces on which respective cam followers are engaged. The cam followers are usually slider buttons or rollers. The cam plate or the set of cam followers is mounted at the back side of the second flange and the other of them is rigidly connected to the shaft. The closing effect of the cam system on the drivebelt tension is then somewhat proportional to output torque.

At the maximum rotation speed, the ratio is maximum as there is the maximum number of rotations or fraction of rotation of the driven pulley for each full rotation of the driving pulley.

When the rotation speed of the motor decreases, the winding diameter of the driving pulley decreases and the radial force exerted by the drivebelt decreases as well, allowing the driven pulley to have a larger winding diameter as the spring moves the second flange towards the first flange. There is then a decrease of the ratio.

Ideally, the drivebelt tension is high under high loads at low speeds to prevent the drivebelt from slipping. However, it should be lower at high speeds to avoid excessive pressure on the drivebelt and to maintain a good efficiency. However, to simplify the construction of the driven pulley or because of physical limitations, the spring is set so that the return force is essentially proportional to its deflection, which is in turn proportional to the distance between the first flange and the second flange. In other words, the minimum return force is generated when the first and second flanges are close to each other, and the maximum return force is generated when there is the maximum distance between the two flanges. This is the opposite of the ideal situation since the gripping force on the drivebelt should be maximum at the minimum ratio and minimum at the maximum ratio. A high gripping force at the minimum ratio is particularly important.

Yet, conventional driven pulleys are not well adapted for reverse torque conditions, which are defined as instances during which the torque is transmitted from the driven pulley to the driving pulley. This occurs generally when the vehicle is decelerating or traveling down a hill. The reverse torque tends to move the cam followers away from the cam surfaces. Only the spring counterbalances the torque at that moment but whenever the torque is larger than a given value, the engagement between the cam followers and the cam surfaces may be lost, resulting in an improper ratio. Also, the gripping force of the drivebelt between the flanges decreases in function of the intensity of the reverse torque.

SUMMARY

The object of the present invention is to provide an improved driven pulley which allows a control of the return force generated by the spring, particularly for being able to have a large gripping force at the minimum ratio and having a lower one at the maximum ratio. It is also an object of the present invention to provide a driven pulley which maintains a good gripping force on the drivebelt even when subjected to a reverse torque.

More particularly, the present invention provides a driven pulley for use in a continuously variable transmission. The driven pulley is coaxially mountable around a main shaft and comprises a first flange having a conical wall on one side thereof. It also comprises a second flange, coaxial with the first flange, and having opposite first and second sides. The first side is provided with a conical wall facing the conical wall of the first flange to form a drivebelt-receiving groove in which a drivebelt is to be partially wound. The second flange is at least axially movable with reference to the first flange.

The driven pulley is characterized in that it further comprises a first radially-extending support coaxial with the first and the second flange. The first support is at a fixed axial distance from the first flange and facing the second side of the second flange. The driven pulley also comprises at least two inclined first cam surfaces that are substantially identical and symmetrically-disposed on one among the second side of the second flange and the first support. First cam followers are symmetrically connected to other one among the second side of the second flange and the first support. Each first cam follower being engageable with a respective one of the first cam surfaces.

At least two inclined and substantially identical second cam surfaces are symmetrically-disposed on the second side of the second flange. The second cam surfaces have an inverted inclination with reference to the first cam surfaces. A second radially-extending support is further provided. The second support is coaxial with the first and the second flange and is at a fixed axial distance from the first flange.

Second cam followers are symmetrically connected to the second support. Each second cam follower is engageable with a respective one of the second cam surfaces. A biasing element is mounted between the first support and the second support. Finally, the driven pulley also comprises means for connecting the first support to the main shaft in a torque-transmitting engagement.

The driven pulley of the present invention may be used in a wide range of vehicles, such as small cars or trucks, snowmobiles, golf carts and scooters. Other applications are possible as well.

A non-restrictive description of the preferred embodiments will now be given with reference to the appended figures.

BRIEF DESCRIPTION OF THE FIGURES

FIG. 11 shows a driven pulley according to a second possible embodiment of the present invention.

FIG. 12 is a cross-sectional view taken along line 12—12 in FIG. 11.

IDENTIFICATION OF THE COMPONENTS

Figure 1:
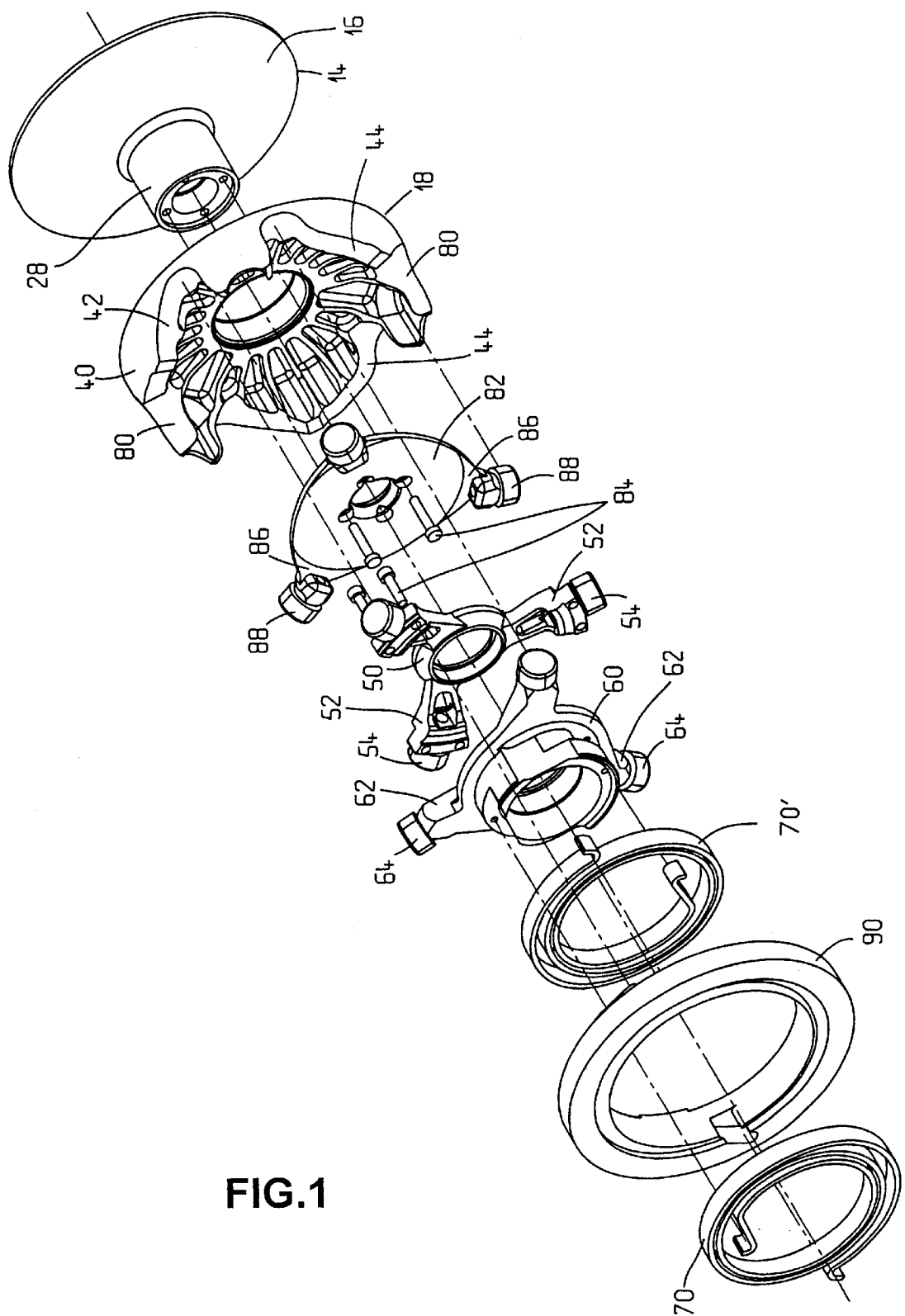
FIG. 1 is an exploded view of a driven pulley according to a first possible embodiment of the present invention.
Figure 2:
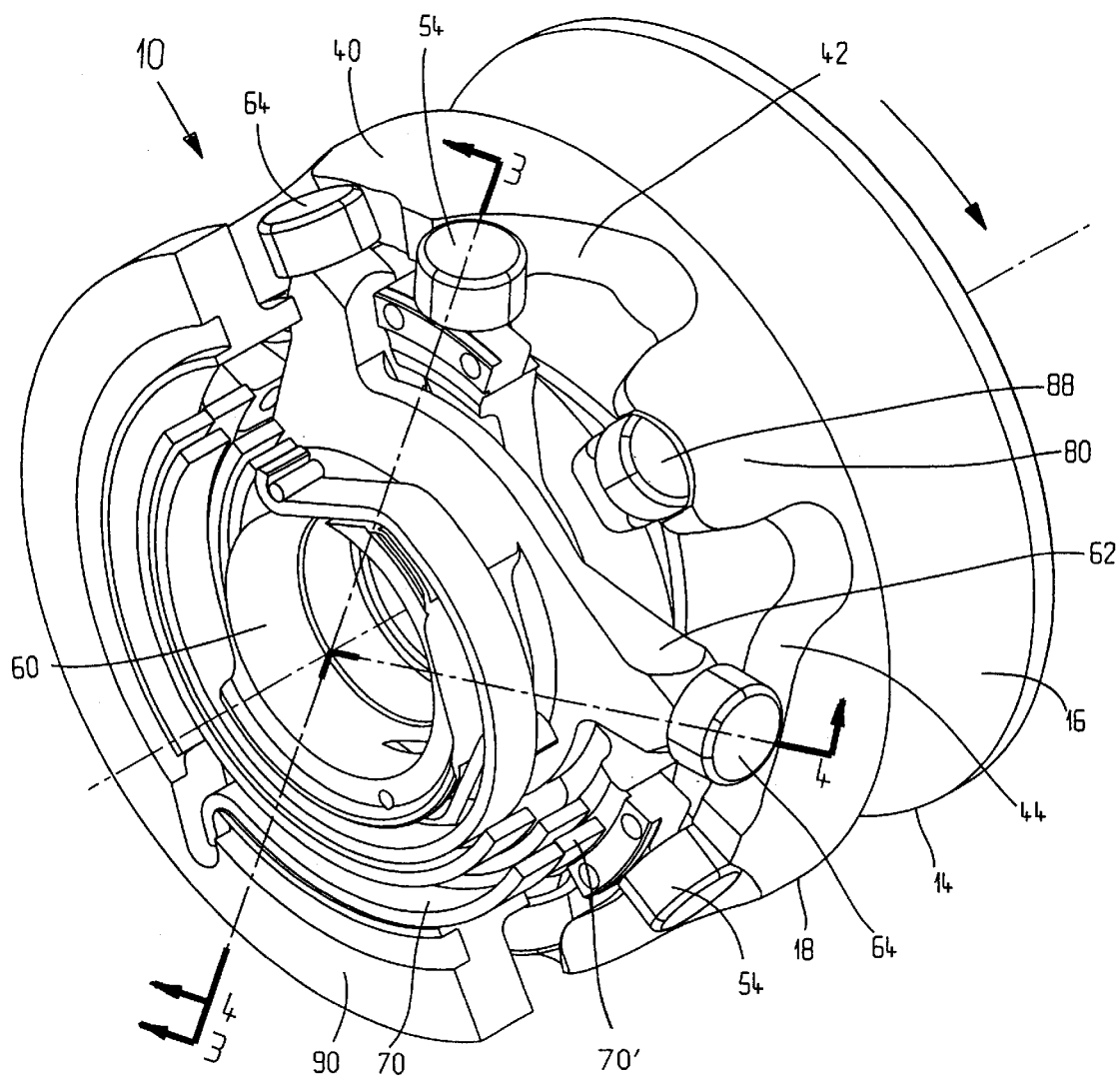
FIG. 2 is a side perspective and partially cut-away view of the assembled driven pulley of FIG. 1, showing the driven pulley at the minimum ratio.

The following is a list of the reference numerals, along with the names of the corresponding components, that are used in the appended figures and in the description.
10 driven pulley
12 main shaft
14 first flange
16 inner conical wall (of the first flange)
17 spline
18 second flange
20 inner conical wall (of the second flange)
22 belt-receiving groove
24 drivebelt
26 ball bearing
28 hub (integral with the first flange)
30 needle bearing (for the hub)
32 bushing (for the second flange)
40 annular cam plate
42 first cam surface
44 second cam surface
50 first radially-extending support
52 arms (of the first support)
54 first cam followers
56 ball bearing (for the first support)
60 second radially-extending support
62 arms (of the second support)
64 second cam followers
66 ball bearing (for the second support)
70 spiral springs
80 axially-extending guides
82 third radially-extending support
84 bolts
86 arms (of the third support)
88 third cam followers
90 ring member
100 clutch mechanism

DESCRIPTION

Figure 13:
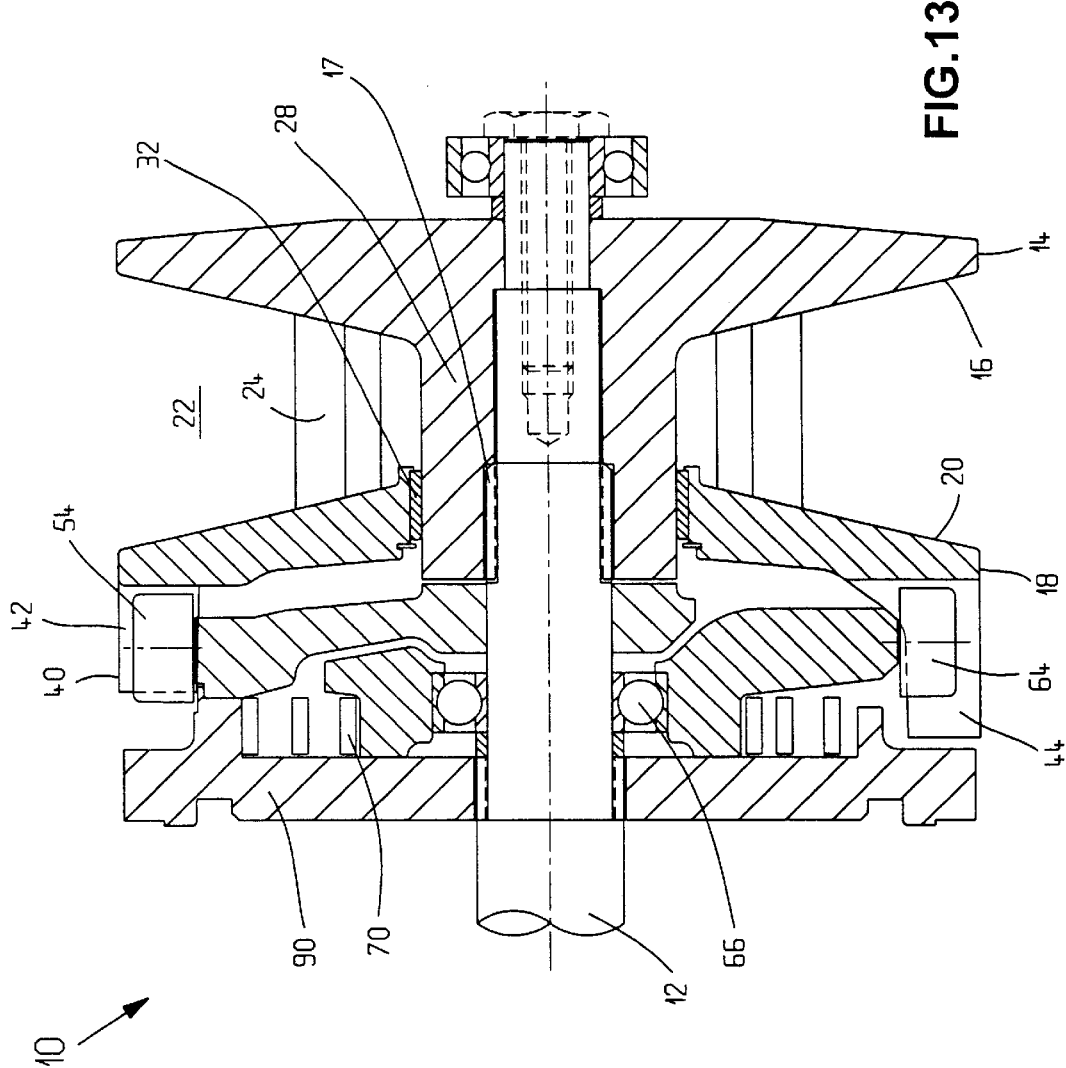
FIG. 13 shows a driven pulley according to a third possible embodiment of the present invention.

FIGS. 1 to 10 show a preferred embodiment of a driven pulley (10) according to the present invention and which is referred to as the "first embodiment" in the present description. FIGS. 11 and 12 show another possible embodiment and which is referred to as the "second embodiment". FIG. 13 shows a further possible embodiment and which is referred to as the "third embodiment". Many other embodiments can be devised as well.

The driven pulley (10) is coaxially mounted around a main shaft (12). It is rotatable around an axis of rotation defined by the central longitudinal axis of the main shaft (12). The center of gravity of the driven pulley (10) is substantially coincident with the axis of rotation. The main shaft (12) is either provided as a support for an assembled unit, which is then removably connected to the output shaft of the vehicle, or the extension of an existing shaft in vehicle on which the parts of the driven pulley (10) are assembled. Yet, the main shaft (12) is either the output shaft or mechanically connected to it.

The driven pulley (10) comprises two opposite conical flanges, namely a first flange (14) and a second flange (18). The first flange (14), sometimes referred to as the "fixed flange" or the "fixed sheave", has an inner conical wall (16) on one side thereof. The second flange (18), sometimes referred to as the "movable flange", the "moveable flange", the "movable sheave" or the "moveable sheave", has two opposite sides. The first side is provided with a conical wall (20) facing the conical wall (16) of the first flange (14) to form a V-shaped belt-receiving groove (22) in which a drivebelt (24) is to be partially wound. The second flange (18) is axially movable with reference to the first flange (14) to vary the winding diameter of the drivebelt (24). It is further pivotable with reference to the first flange (14) in the second and the third embodiment.

The connection between the first flange (14) and the main shaft (12) depends on the embodiment. In the first and second embodiments, the first flange (14) is freely rotatable around the main shaft (12) since it is mounted thereon by means of a ball bearing (26). This particular arrangement allows to selectively dissociate the movement of the main shaft (12) from that of the driven pulley (10).

In the third embodiment, the first flange (14) is connected to the main shaft (12) by a spline (17) which enables them to rotate together. It could also be connected by other appropriate means, such as with an interfering engagement, fasteners, welding or any other suitable means or combinations thereof. The second flange (18) is preferably mounted around a hub (28) that is integral or otherwise connected to the first flange (14). The hub (28) is coaxially mounted around the main shaft (12) by means of a needle bearing (30) or any other suitable arrangements. The second flange (18) is preferably supported around the hub (28) by a bushing (32).

According to the present invention, the driven pulley (10) further comprises an annular cam plate (40) that is preferably connected to the second side of the second flange (18). The cam plate (40) comprises at least two inclined first cam surfaces (42), preferably three, that are substantially identical and symmetrically-disposed. The cam plate (40) also comprises at least two inclined second cam surfaces (44), preferably three, that are substantially identical and symmetrically-disposed. The inclination of the first (42) and second cam surfaces (44) is relative to a plane perpendicular to the longitudinal axis of the main shaft (12). The second cam surfaces (44) have an inverted inclination with reference to the first cam surfaces (42). Yet, the first (42) and the second cam surfaces (44) are preferably located side by side, as shown for instance in FIG. 5.

Figure 3:
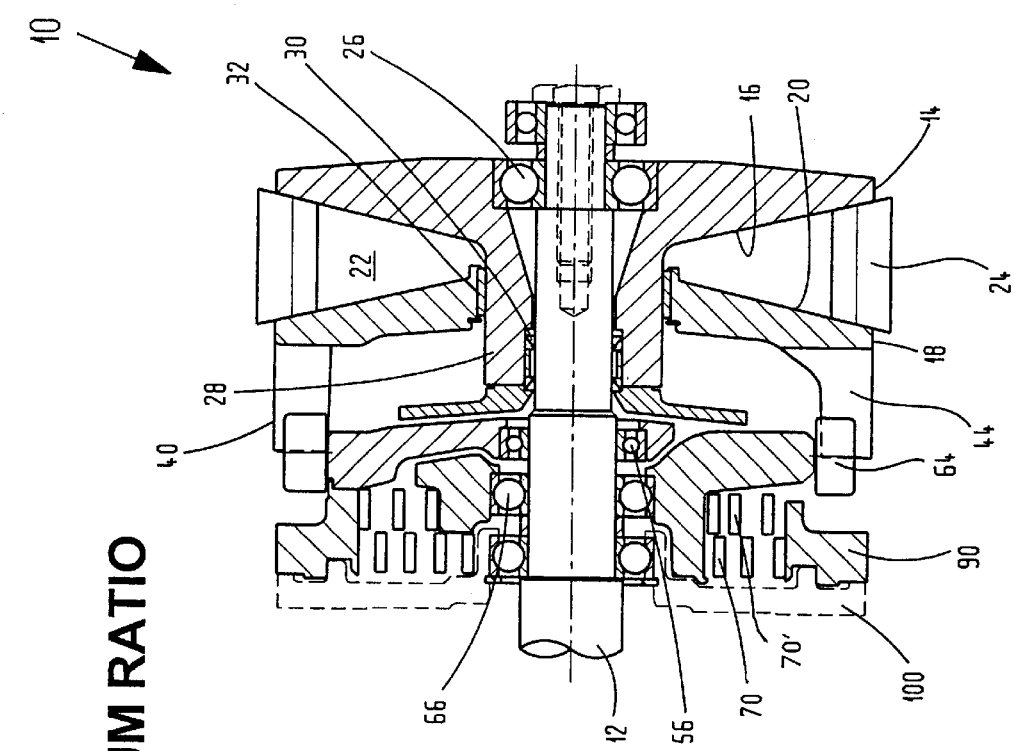
FIG. 3 is a cross-sectional view taken along line 3—3 in FIG. 2.
Figure 4:
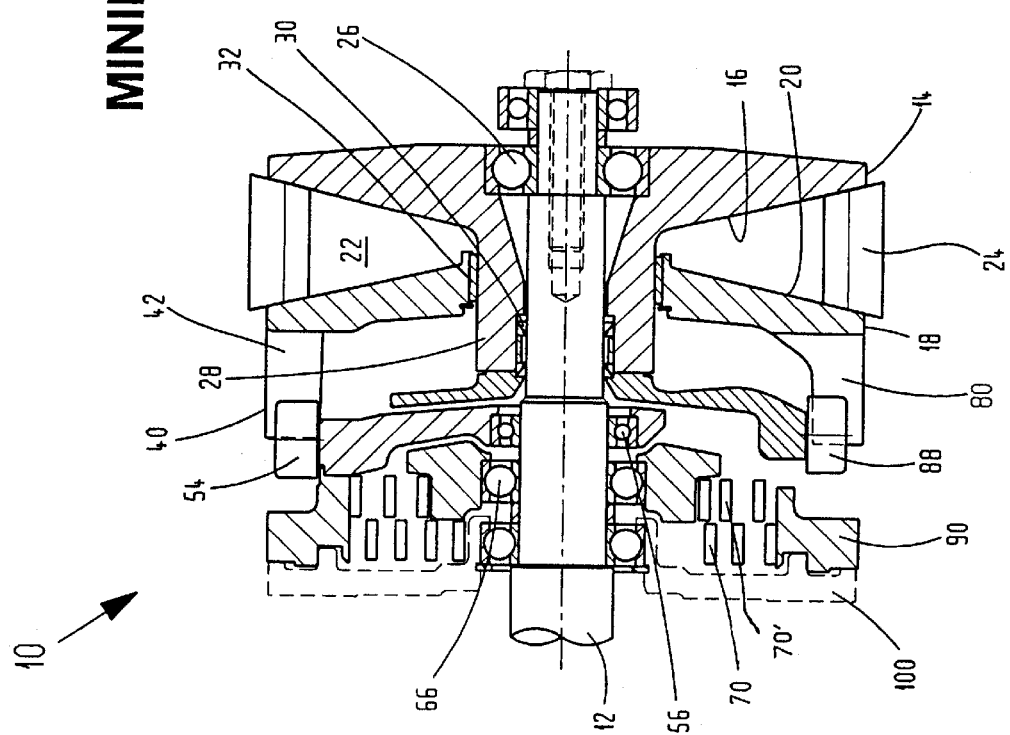
FIG. 4 is a cross-sectional view taken along line 4—4 in FIG. 2.

The driven pulley (10) further comprises a first radially-extending support (50) that is coaxial with the first (14) and the second flange (18), and therefore with the main shaft (12). The first support (50) is set at a fixed axial distance from the first flange (14). This can be achieved in many ways. In the first embodiment, as shown in FIGS. 3 and 4, the first support (50) is mounted on the main shaft (12) by means of a ball bearing (56), itself mounted at a fixed point on the main shaft (12). In the second embodiment, as shown in FIG. 11, the first support (50) is rigidly connected to the end of the hub (28) and further supported on the main shaft (12) by means of the ball bearing (56). FIG. 12 shows how the hub (28) and the first support (50) are imbricated. In the third embodiment, as shown in FIG. 13, the first support (50) is rigidly connected to the main shaft (12) by an appropriate means. Other arrangements are also possible.

Each of the first supports (50) in the illustrated embodiments comprises at least two, preferably three, radially-extending arms (52) that are substantially identical and symmetrically-disposed. A disk-shaped configuration is an example of another possible form for the first support (50). Preferably, a set of first cam followers (54) are symmetrically connected at respective ends of the arms (52) of the first support (50). Each first cam follower (54) is engageable with a respective one of the first cam surfaces (42). There are thus preferably three first cam followers (54). The first cam followers (54) are preferably rollers to minimize the friction. They can also be provided as slider buttons (not shown) that are made of a material having a low friction coefficient.

The position of the first cam surfaces (42) and the first cam followers (54) may be inverted. It is then possible to have the first cam surfaces (42) on the arms (52) of the first support (50) and the first cam followers (54) on the back side of the second flange (18).

One other function of the first cam surfaces (42) and the first cam followers (54) is that they provide a support for the second flange (18) when three or more of them are provided. The position of the various parts has to be accurate because there is only one bushing (32) and that the drivebelt (24) is wound around only one half of the driven pulley (10), creating unbalanced forces that could generate vibrations if the driven pulley (10) is not properly held. Alternatively, two or more spaced-apart bushings may be used.

The driven pulley (10) comprises a second radially-extending support (60) that is coaxial with the first (14) and the second flange (18). Like the first support (50), the second support (60) is also at a fixed axial distance from the first flange (14). It is supported on the main shaft (12) by means of a ball bearing (66) or the like.

A set of second cam followers (64) are symmetrically connected to the second support (60), more particularly to the end of respective arms (62) thereof. Each second cam follower (64) is engageable with a respective one of the second cam surfaces (44). There are thus preferably three second cam followers (64). Like the first cam followers (54), the second cam followers (64) are preferably rollers to minimize the friction. They can also be provided as slider buttons (not shown) that are made of a material having a low friction coefficient.

A biasing element is provided to elastically interconnect the first support (50) and the second support (60). The biasing element preferably comprises a spring or a set of springs, such as two parallel spiral springs (70 and 70') that generate a return torque. The cross section of these springs (70 and 70') is preferably rectangular but another shape is also possible. Each have one end connected to a notch of the first support (50), or to an object rigidly connected thereto, and the other end is connected to a corresponding notch of the second support (60). Other arrangements and kinds of springs are also possible, as apparent to a person skilled in the art.

Since they are interconnected, the first cam followers (54) and the second cam followers (64) are urged against their respective first (42) and second cam surfaces (44). Then, because the first support (50) and the second support (60) are at a fixed position on the main shaft (12). The springs (70, 70') generate an axial reaction on the second flange (18) which applies a force on the second flange (18) toward the first flange (14) and thus generate the return force. This is further explained later in the description.

Even in the first and second embodiments, means are provided for connecting the first support (50) to the main shaft (12) in a torque-transmitting engagement. This allows the torque transmitted through the second flange (18) to be transmitted to the main shaft (12) or vice versa. In the first embodiment, means are provided for connecting the first flange (14) and the second flange (18) in a sliding relationship and substantially preventing a relative rotation between them. This avoids the shearing in the drivebelt (24) that is usually associated with a relative rotation between the first (14) and the second flange (18). The means for connecting the first flange (14) and the second flange (18) preferably comprise at least two axially-extending guides (80), preferably three, that are symmetrically provided on the second side of the second flange (18). The means further comprise a third radially-extending support (82) that is coaxial with the first (14) and the second flange (18).

The third support (82) is rigidly connected to first flange (14), preferably at the end of the hub (28). Bolts (84) or the like may be used to fasten the parts together. The third support (82) preferably comprises three arms (86), one for each guide (80). The ends of the arms (86) bear respective third cam followers (88) that are symmetrically connected to the third support (82). Each third cam follower (88) is in a sliding engagement with its respective guide (80) and preferably comprises a roller. A slider button or any other suitable device may also be used as well.

Alternatively, such as in the second and third embodiments, the second flange (18) may be in a sliding and pivoting relationship with reference to the first flange (14). There is then a relative rotation between the first (14) and the second flange (18) when the distance between them changes.

In use, the torque will be provided from the drivebelt (24) and then to the two conical walls (16,20). In the first embodiment, the first cam followers (54) will receive all the torque coming from the motor since the first (14) and the second flange (18) are in a direct torque-transmitting engagement. In the second embodiment, the first (14) and the second flange (18) are in an indirect torque-transmitting engagement since the torque of the first flange (14) is directly transmitted to the first support (50).

Figure 5:
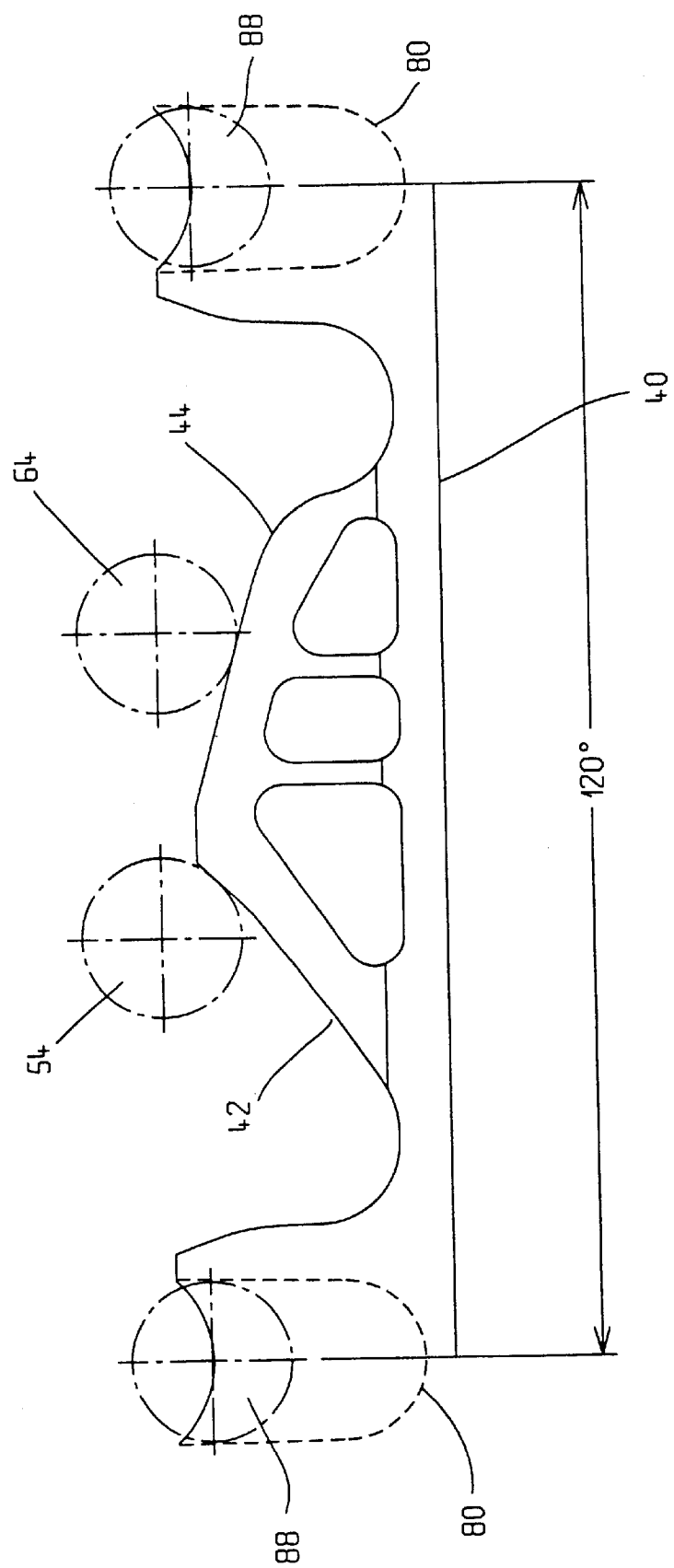
FIG. 5 is a schematic cylindrical representation of the respective positions of the various followers in FIG. 2.
Figure 6:
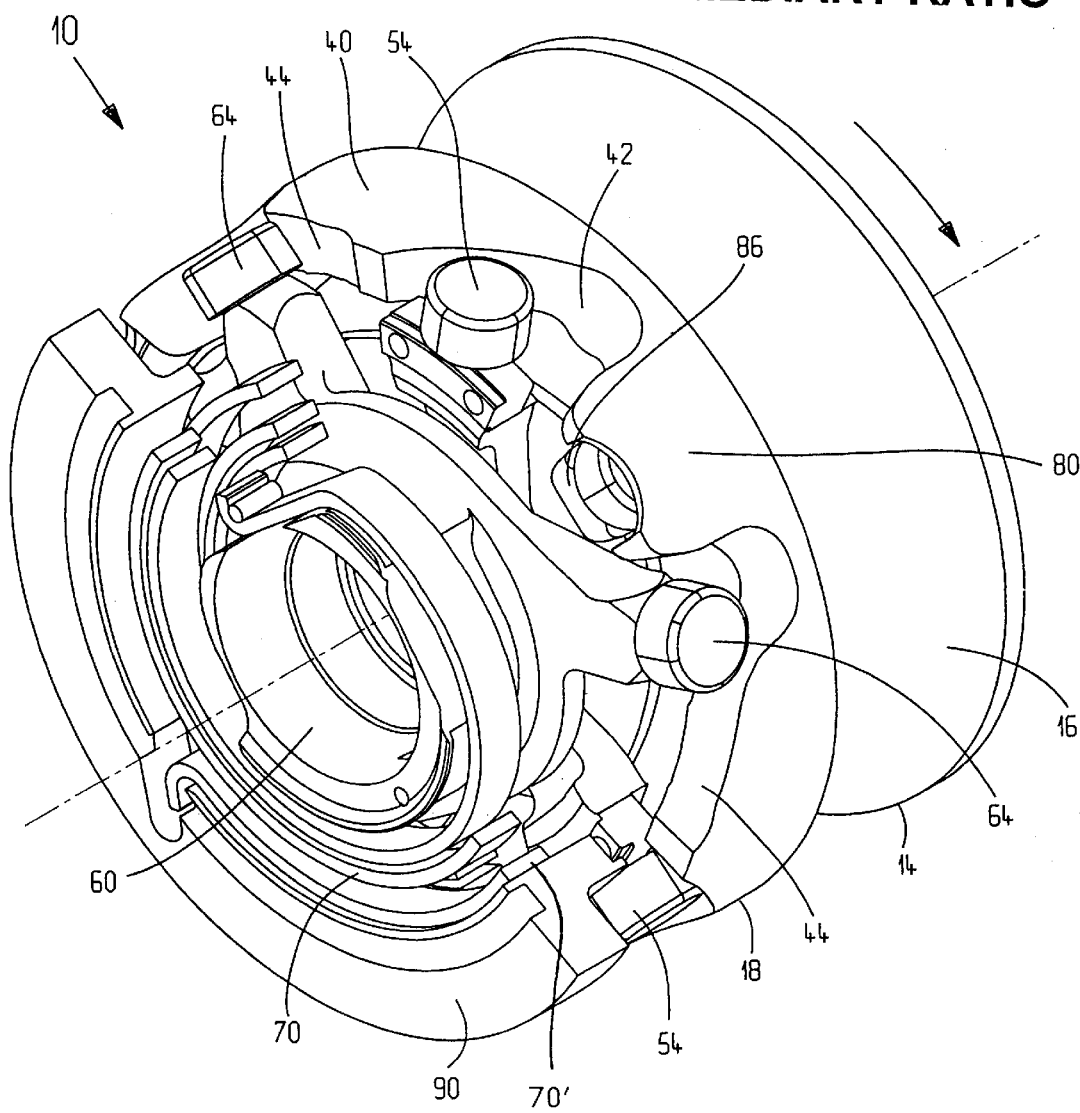
FIG. 6 is another side perspective and partially cut-away view of the assembled driven pulley of FIG. 1, showing the driven pulley at an intermediary ratio.
Figure 10:
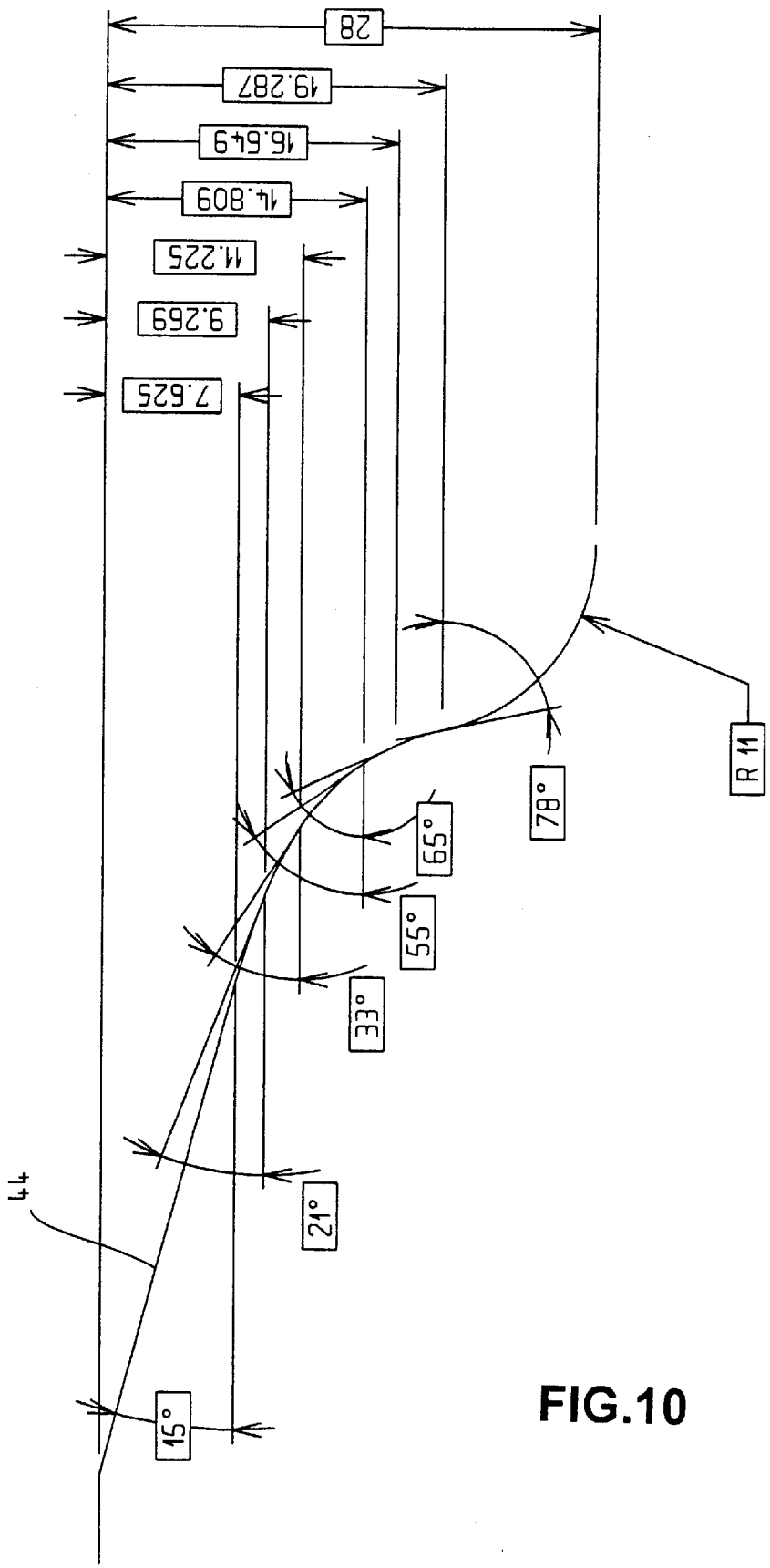
FIG. 10 is an enlarged schematic view showing the details of a second cam surface in a typical driven pulley for an automobile.

FIG. 5 shows an example of a pair of adjacent first (42) and second cam surfaces (44) with their respective first (54) and second cam followers (64), in this case comprising rollers. The gripping force on the drivebelt (24) is high at the minimum ratio with this design since the angle of the second cam surface (44) with reference to the horizontal is small. FIG. 10 gives an example of the value of the angle in the case of a driven pulley (10) for an automobile. The values other than angles are in millimeters. The radial force on the drivebelt (24) has to be very high to move the second flange (18) with reference to the second cam follower (64) so that the second cam follower (64) be moved laterally toward the bottom of the second cam surface (44).

Figure 7:
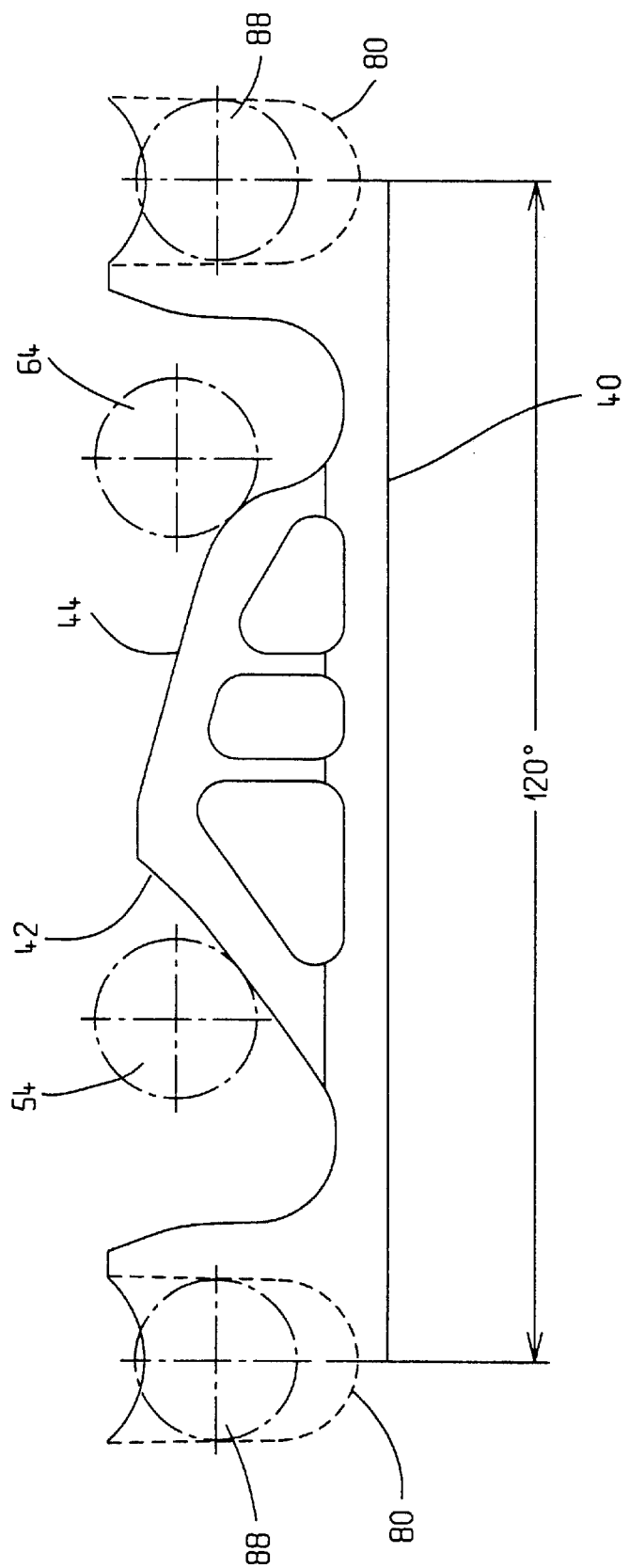
FIG. 7 is a schematic cylindrical representation of the respective positions of the various followers in FIG. 6.
Figure 8:
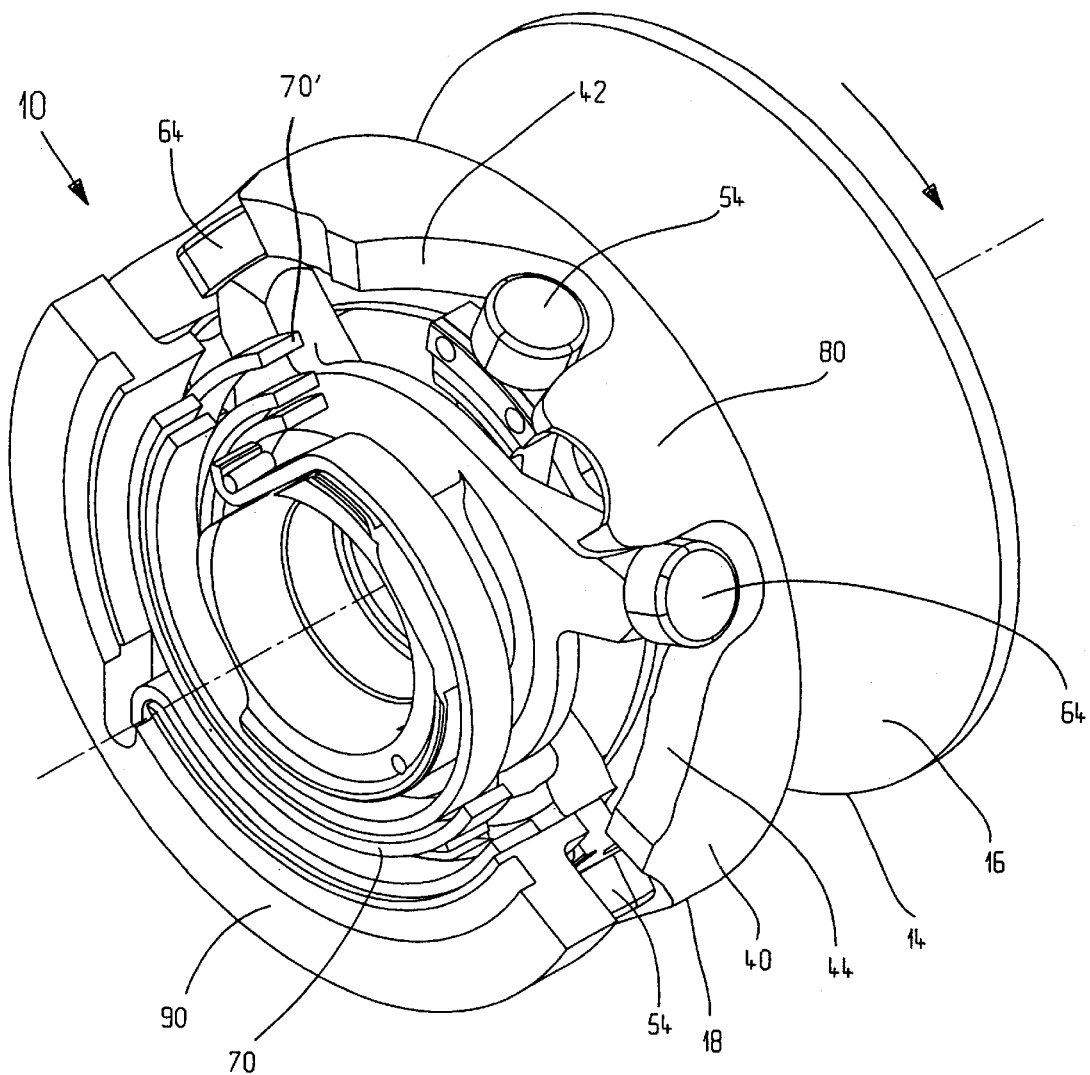
FIG. 8 is another side perspective and partially cut-away view of the assembled driven pulley of FIG. 1, showing the driven pulley set at the maximum ratio.
Figure 9:
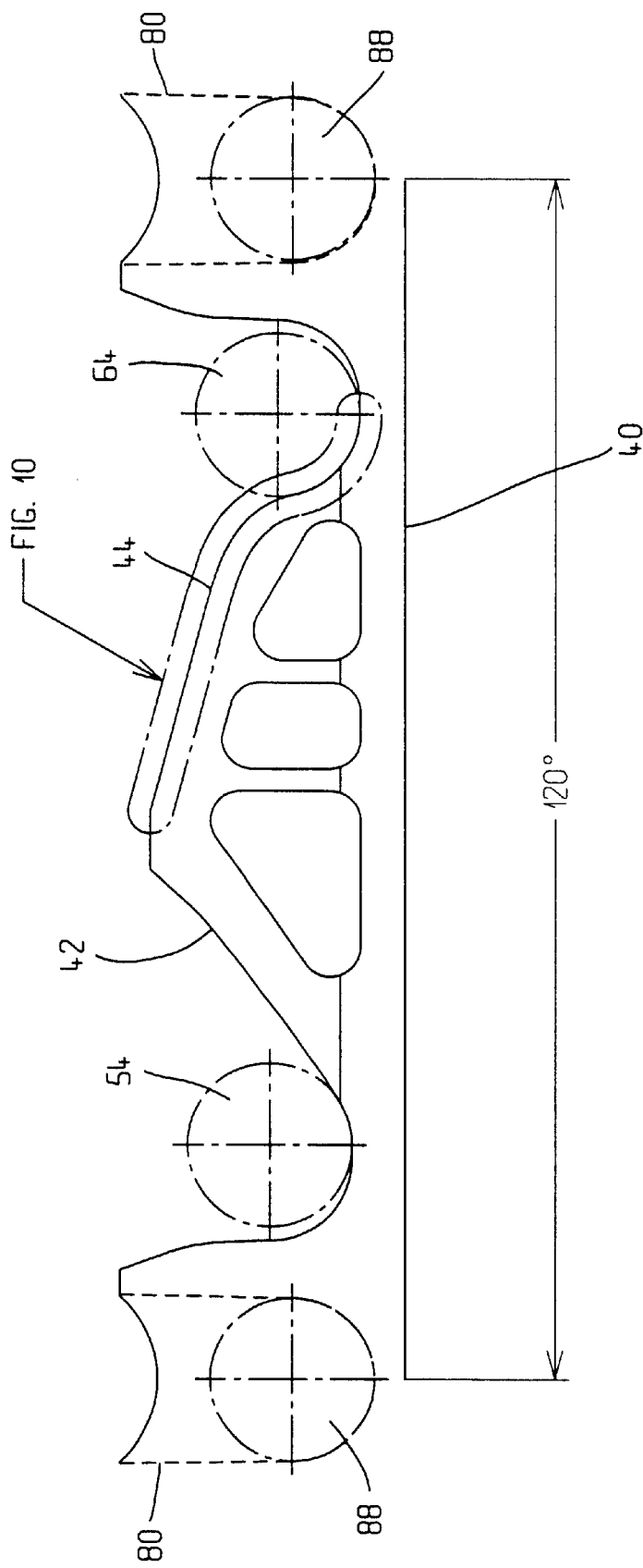
FIG. 9 is a schematic cylindrical representation of the respective positions of the various followers in FIG. 8.

FIG. 7 is a view similar to FIG. 5 but at an intermediary ratio. At that point, the angle of the second cam surface (44) with the horizontal increases. It will thus be easier to move the second flange (18) in direction of the second cam followers (64). In FIG. 9, the ratio is maximum. The second cam follower (64) lies at the bottom of the second cam surface (44). The angle of the second cam surface (44) at that location is 78° in the example. The axial reaction of the force generated by the spiral springs (70 and 70') is then minimal, in spite of the fact that the springs are further compressed and generate a higher return torque. Of course, the angles of the fist (42) and second cam surfaces (44) are a question of design and other arrangements are possible, depending on the requirements.

Preferably, the first support (50) is connected to the main shaft (12) by means of a ring member (90) that is coaxial with the first (14) and the second flange (18). The ring member (90) is rigidly connected to the first support (50) or made integral therewith. In the first and second embodiments, the means provided for connecting the first support (50) to the main shaft (12) comprise a clutch mechanism (100) connected to the ring member (90) and selectively engageable with the main shaft (12). In the third embodiment, the first support (50) or the ring member (90) is rigidly connected to the main shaft (12) so that no clutch mechanism is necessary. Alternatively, the ring member (90) can be provided with a set of outer teeth (not shown) to which a gear or a chain (not shown) is connected. It can also be provided with a circumferential outer groove (not shown) to which a supplemental drivebelt (not shown) is wound to transmit the mechanical movement to the wheels or tracks of the vehicle.

The invention is not limited to the described embodiment and encompasses any alternative embodiments within the limits defined by the appended claims.

What is claimed is:

1. A driven pulley for use in a continuously variable transmission, the driven pulley being coaxially mountable around a main shaft and comprising:
   a first flange having a conical wall on one side thereof;
   a second flange coaxial with the first flange and having opposite first and second sides, the first side being provided with a conical wall facing the conical wall of the first flange to form a drivebelt-receiving groove in which a drivebelt is to be partially wound, the second flange being at least axially movable with reference to the first flange;
   a first radially-extending support coaxial with the first and the second flange, the first support being at a fixed axial distance from the first flange and facing the second side of the second flange;
   at least two inclined first cam surfaces that are substantially identical and symmetrically-disposed on one among the second side of the second flange and the first support;
   first cam followers symmetrically connected to other one among the second side of the second flange and the first support, each first cam follower being engageable with a respective one of the first cam surfaces;
   at least two inclined second cam surfaces that are substantially identical and symmetrically-disposed on the second side of the second flange, the second cam surfaces having an inverted inclination with reference to the first cam surfaces;
   a second radially-extending support coaxial with the first and the second flange, the second support being at a fixed coaxial distance from the first flange;
   a biasing element elastically interconnecting the first support and the second support; and
   means for connecting the first support to the main shaft in a torque-transmitting engagement.

2. A driven pulley according to claim 1, further comprising means for connecting the first flange and the second flange in a sliding relationship and substantially preventing a relative rotation between them.

3. A driven pulley according to claim 1, wherein the means for connecting the first support to the main shaft comprises a ring member coaxial with the first and the second flange, the ring member being rigidly connected to the first support.

4. A driven pulley according to claim 1, wherein the means for connecting the first support to the main shaft comprise means for rigidly connecting the first flange and the first support to the main shaft.

5. A driven pulley according to claim 1, wherein the first cam surfaces, the second cam surfaces, the first cam followers and the second cam followers are each three in number.

6. A driven pulley according to claim 1, wherein each of the first cam followers and the second cam followers comprises a roller.

7. A driven pulley according to claim 2, wherein the means for connecting the first and second flanges comprise:
   at least two axially-extending guides symmetrically provided on the second side of the second flange;
   a third radially-extending support coaxial with the first and the second flange, the third support being rigidly connected to the first flange; and
   third cam followers symmetrically connected to the third support, each third cam followers being in sliding engagement with a respective one of the axially-extending guides.

8. A driven pulley according to claim 3, wherein the means for connecting the first support to the main shaft further comprises a clutch mechanism connected to the ring member and selectively engageable with the main shaft.

9. A driven pulley according to claim 7, wherein the third support is rigidly connected to the first flange by means of a hub that is coaxially mounted around the main shaft and rigidly connected or integral with the first flange, the second flange being in sliding engagement on the hub.

10. A driven pulley according to claim 8, wherein the biasing element comprises at least one spring having one end connected to the second support and another end connected to the ring member.

11. A driven pulley according to claim 9, wherein each of the third cam followers comprises a roller.

12. A driven pulley according to claim 10, wherein the biasing element comprises at least one spiral spring.

13. A driven pulley according to claim 11, characterized in that the guides and the third cam followers are each three in number.

14. A driven pulley according to claim 12, wherein there are two parallel spiral springs.

* * * * *